(No Model.) 2 Sheets—Sheet 1.

F. D. PIERCE.
STEAM GENERATOR FOR ROAD VEHICLES OR OTHER PURPOSES.

No. 263,954. Patented Sept. 5, 1882.

Witnesses: Geo. Karbach, Chas. G. Johnston.

Franklin D. Pierce, Inventor.

N. PETERS, Photo-Lithographer, Washington, D. C.

(No Model.)  2 Sheets—Sheet 2.
F. D. PIERCE.
STEAM GENERATOR FOR ROAD VEHICLES OR OTHER PURPOSES.
No. 263,954.  Patented Sept. 5, 1882.
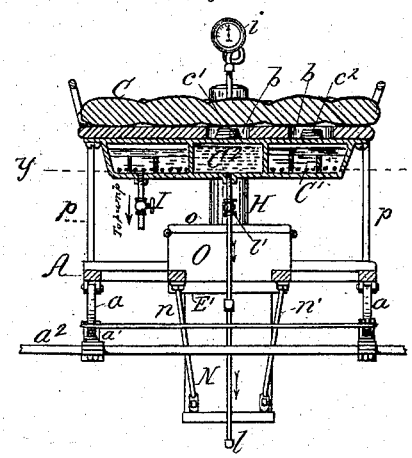
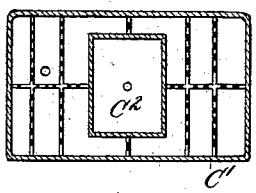
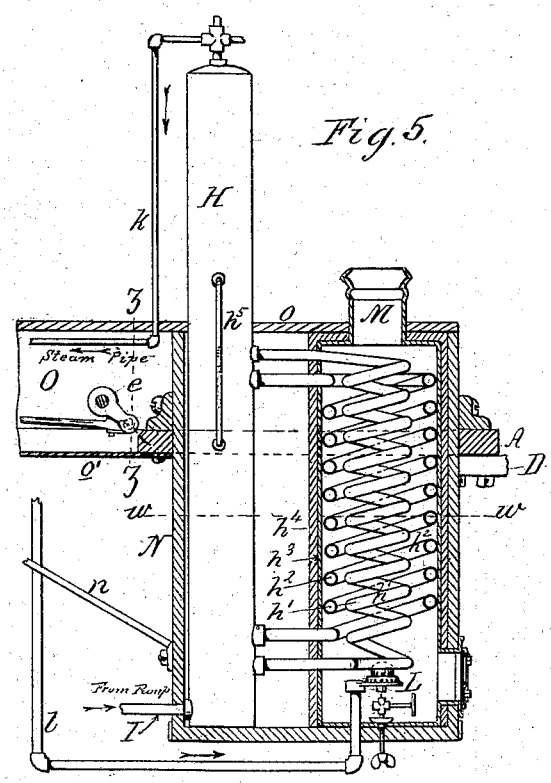
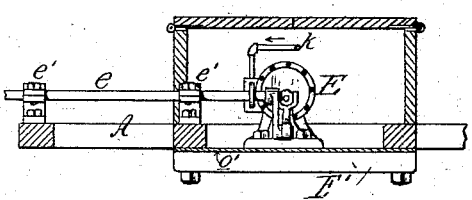
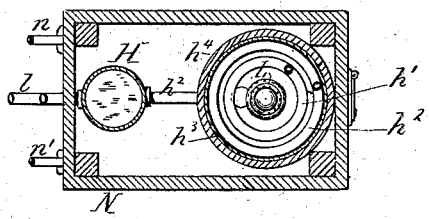
Witnesses: Geo Kerbach, Chas. G. Johnston
Franklin D. Pierce, Inventor

UNITED STATES PATENT OFFICE.

FRANKLIN D. PIERCE, OF BUFFALO, NEW YORK.

STEAM-GENERATOR FOR ROAD-VEHICLES OR OTHER PURPOSES.

SPECIFICATION forming part of Letters Patent No. 263,954, dated September 5, 1882.

Application filed November 9, 1881. (No model.)

*To all whom it may concern:*

Be it known that I, FRANKLIN D. PIERCE, a citizen of the United States, residing at Buffalo, in the county of Erie and State of New York, have invented a new and Improved Steam-Generator for Road-Vehicles or other Purposes; and I do hereby declare that the following is a full, clear, and exact description of the construction and operation of the same, reference being had to the accompanying drawings, making a part of this specification.

The object of my invention is to furnish a light, compact, and cheap steam-generator for the driving mechanism for road-vehicles, which will be fully and clearly described hereinafter by reference to the accompanying drawings, in which—

Figure 1:
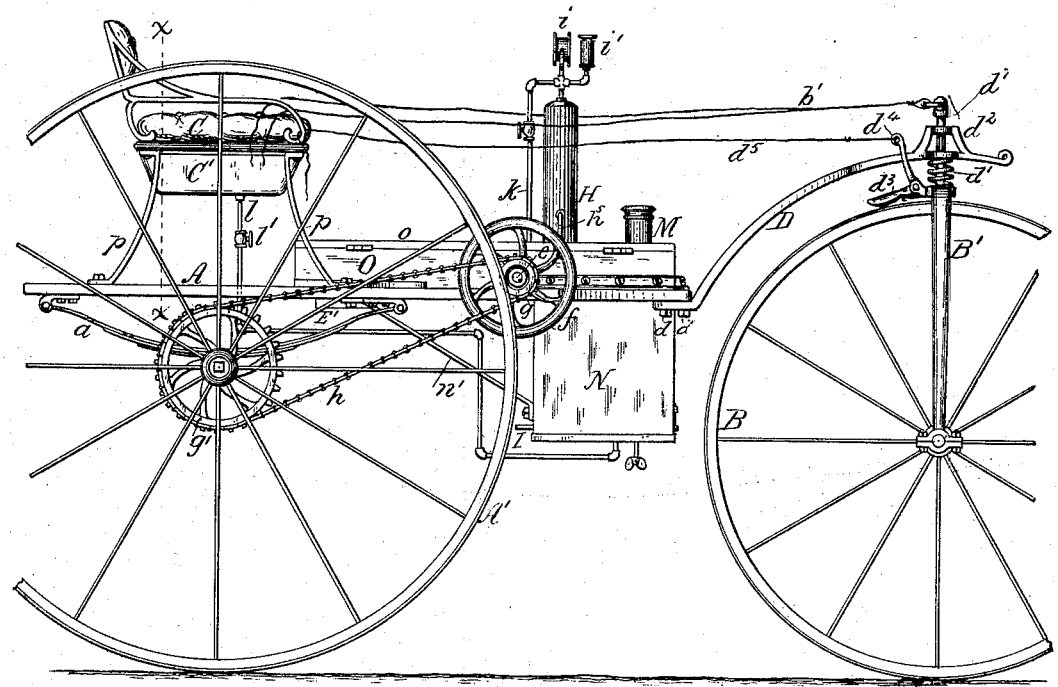
Figure 2:
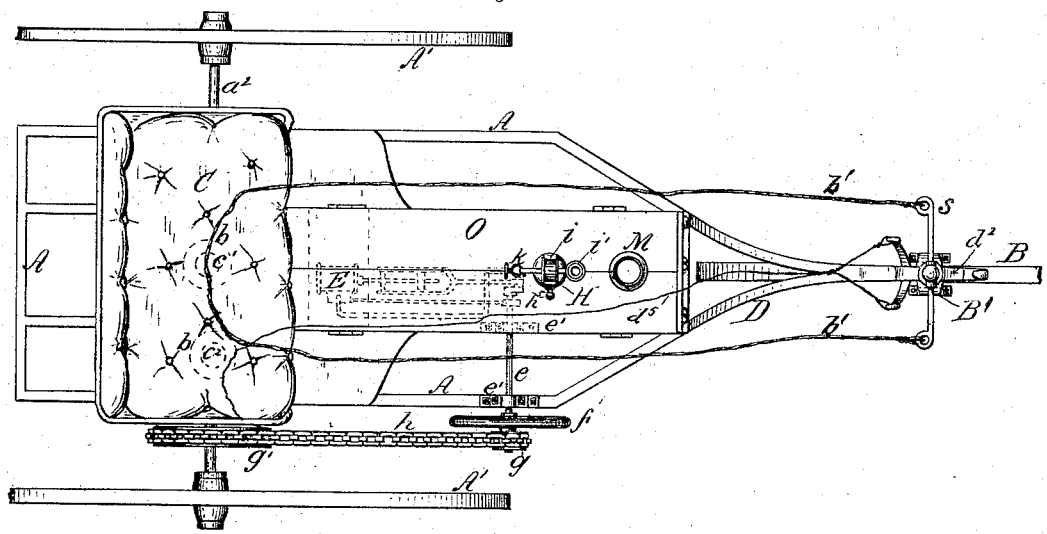

Figure 1 is a vehicle showing my invention connected thereto. Fig. 2 is a plan or top view of same. Fig. 3 is a vertical cross-section on line X X, Fig. 1, through the reservoirs and the seat. Fig. 4 is a horizontal section of the reservoirs for fuel and water. Fig. 5 is a vertical section through the steam-generator on an enlarged scale. Fig. 6 is a cross-section on line $z\,z$, Fig. 5, on an enlarged scale, looking to the left of the sheet or to the rear of the vehicle. Fig. 7 is a horizontal section of the steam-generator on line $w\,w$, Fig. 5.

A represents the frame or body of the vehicle, which is constructed of the usual materials.

A' are the driving-wheels, rigidly secured to the axle-shaft $a^2$. In wide-track vehicles, however, they may be placed loosely on the axle-shaft and fastened thereto by a clutch mechanism, whereby the outer wheel may be permitted to make a greater number of revolutions than the inner in rounding a curve; or they may be placed loosely on the axle $a^2$ and the sprocket-wheel $g'$ secured to the hub of the off wheel, in which case that wheel only serves as a driver.

C represents the seat of the vehicle resting upon and secured to the frame or body A by the supports P P, which may be constructed of any suitable material.

C' is the water-reservoir, which is secured to the under side of the seat and provided on its upper side with a screw-cap, $c^2$, extending upwardly through the opening $b\,b$ in the seat. By removing the cushion of the seat and the screw-cap $c^2$ the reservoir may be filled.

The water-reservoir C' is provided with perforated communicating compartments $c^5$, (see Figs. 3 and 4,) for the purpose of preventing the swashing of the water while the vehicle is in motion.

The fuel-reservoir $C^2$ is arranged within the reservoir C', so as to be surrounded by water, which keeps it cool and prevents evaporation and all danger of explosion.

D represents the usual curved reach, the rear ends of which are secured to the under sides of the frame A by bolts $d\,d$, or in any other well-known manner.

E (see Fig. 2) is the engine, arranged horizontally within a casing, O, of wood or other suitable material. The top of the casing O is made in two pieces, which are hinged so that they may be opened to get at the engine. The bottom of the casing O may be constructed of zinc or other suitable material. The object of this casing O is to keep the engine clean or free from dust or dirt.

$f$ represents a fly-wheel arranged on the crank-shaft $e$, so that it may be conveniently reached by the hand of the driver in starting the engine.

The cylinder of the engine and the guide for the piston-rod are secured to a bed-plate, E', which in turn is secured to the under side of the frame or body A.

The steam-generator consists essentially of coils of tubing, (two in this case, $h'\,h^2$, Fig. 5.) The coil $h^2$ surrounds the coil $h'$, and both are connected at their ends with a cylinder or stand-pipe, H, which is secured to the casing N, and which is provided with a water-gage, $h^5$, a steam-gage, $i$, and a spring or pop safety-valve, $i'$, and which is supplied with water through a feed-pipe, I. The water entering the cylinder or stand-pipe H from the upper ends of the coils $h'\,h^2$ falls, and again enters them at their lower ends, while the steam rises to the upper part of the cylinder or stand-pipe H, from which it is conducted to the engine E. The coils $h'\,h^2$ are inclosed by a metallic casing, $h^3$, which is secured to the casing N, and which may be provided with inwardlyprojecting hooks to assist in the support of the coils. The metallic casing is covered with asbestus felt, or some other suitable non-conductor, $h^4$, (see Figs. 5 and 7,) and the entire generator, except the upper portion of the stand-pipe H, is inclosed by the wood casing N, which is secured to the frame A and stayed by braces $n$ $n'$, secured to the lower and rear side of the casing N and to the under side of the frame A.

M is a chimney-pipe for the escape of the products of combustion after they have passed above the coiled tubes $h'$ $h^2$, and which is secured to the metallic casing $h^3$. The steam-generator is provided with a hydrocarbon-burner, L, of well-known construction, which is secured to the casing of said generator. The burner is supplied with gasoline or other liquid hydrocarbon fuel by the pipe which is connected with the fuel-reservoir $C^2$ and provided with a cock, $l'$. In this form of steam-generator there is no shell to explode, and the tubes of which it is composed are capable of sustaining a very high pressure. Hence it is comparatively safe, and, having a large heating-surface and a rapid circulation, it generates steam in large quantity and quickly for its size and weight; hence its adaptability for the purposes set forth.

I lay no claim to the vehicle or carriage in this application alone, of itself considered, as I may make that the subject of another application.

I claim as my invention—

1. A water-reservoir surrounding a fuel-reservoir and having a series of perforated plates, substantially as shown, for the purpose of preventing the swashing or pitching of the water, in combination with a feed-pipe, I, and a steam-generator, as described.

2. A steam-generator provided with a suitable hydrocarbon-burner and water and fuel reservoirs, substantially as specified, in combination with a steam-engine inclosed within a casing and the running-gear of a road-vehicle, substantially as and for the purposes described.

3. A steam-generator consisting of the coils $h'$ $h^2$, inclosed within a non-conducting casing, and provided with a stand-pipe, H, and a hydrocarbon-burner, L, in combination with a water-reservoir, $C'$, provided with perforated partitions, and a fuel-reservoir, $C^2$, arranged within it, as and for the purposes specified.

4. The water and fuel reservoirs $C'$ $C^2$, arranged below the seat C, in combination with the pipe $l$, burner L, and a steam-generator, as and for the purposes described.

5. A steam-generator consisting of the coils $h'$ $h^2$, inclosed within a non-conducting casing, and provided with a stand-pipe, H, and a hydrocarbon-burner, L, in combination with feed-pipe I and a water-reservoir, $C'$, arranged below the seat C, as and for the purposes specified.

In testimony whereof I affix my signature in the presence of two subscribing witnesses.

FRANKLIN D. PIERCE.

Witnesses:
GEO. J. KARBACH,
JOSEPH J. DORY.